United States Patent
Caffier et al.

(10) Patent No.: US 12,297,362 B2
(45) Date of Patent: *May 13, 2025

(54) NON NEWTONIAN BALLPOINT PEN INK COMPRISING CELLULOSE NANOFIBERS

(71) Applicant: Société BIC, Clichy (FR)

(72) Inventors: Guillaume Caffier, Clichy (FR); Wing Yam Liu, Clichy (FR)

(73) Assignee: Société BIC, Clichy (FR)

( * ) Notice: Subject to any disclaimer, the term of this patent is extended or adjusted under 35 U.S.C. 154(b) by 662 days.

This patent is subject to a terminal disclaimer.

(21) Appl. No.: 17/425,064

(22) PCT Filed: Jan. 24, 2020

(86) PCT No.: PCT/EP2020/051830
§ 371 (c)(1),
(2) Date: Jul. 22, 2021

(87) PCT Pub. No.: WO2020/152357
PCT Pub. Date: Jul. 30, 2020

(65) Prior Publication Data
US 2022/0098423 A1    Mar. 31, 2022

(30) Foreign Application Priority Data
Jan. 25, 2019    (EP) .................................... 19305099

(51) Int. Cl.
| | |
|---|---|
| C09D 11/18 | (2006.01) |
| C08K 3/36 | (2006.01) |
| C08K 5/05 | (2006.01) |
| C08K 7/02 | (2006.01) |
| C09D 11/17 | (2014.01) |

(52) U.S. Cl.
CPC ................ C09D 11/18 (2013.01); C08K 3/36 (2013.01); C08K 5/05 (2013.01); C08K 7/02 (2013.01); C09D 11/17 (2013.01); C08K 2201/003 (2013.01); C08K 2201/011 (2013.01)

(58) Field of Classification Search
None
See application file for complete search history.

(56) References Cited

U.S. PATENT DOCUMENTS

| 5,942,027 | A | 8/1999 | Ikai et al. |
| 9,365,732 | B2 | 6/2016 | Otsubo et al. |
| 2022/0073705 | A1* | 3/2022 | Nelson ............... C09D 197/005 |

FOREIGN PATENT DOCUMENTS

| CN | 104109413 | | 10/2014 |
| CN | 108165094 | A | 7/2021 |
| EP | 3070131 | | 9/2016 |
| EP | 3199601 | | 8/2017 |
| JP | H 10-204368 | A | 8/1998 |
| JP | 2005-33641 | | 12/2005 |
| JP | 2005-336411 | * | 12/2005 |
| JP | 2007-153941 | | 6/2007 |
| JP | 2008-013585 | A | 1/2008 |
| JP | 2008-189697 | A | 8/2008 |
| JP | 2014047249 | A | 3/2014 |
| JP | 2015-067801 | | 4/2015 |
| JP | 2016-069617 | | 5/2016 |
| JP | 2017-105907 | | 6/2017 |
| JP | 2017-108871 | | 6/2017 |
| JP | 2017125135 | A | 7/2017 |
| JP | 2018-104617 | | 7/2018 |
| JP | 2018-135405 | | 8/2018 |
| WO | 2013031845 | A1 | 3/2013 |

OTHER PUBLICATIONS

Machine translation of JP 2005-336411 (Year: 2005).*
International Search Report dated Mar. 18, 2020 in corresponding International PCT Patent Application No. PCT/EP2020/051830, 6 pgs.
Written Opinion dated Mar. 18, 2020 in corresponding International PCT Patent Application No. PCT/EP2020/051830, 6 pgs.
International Preliminary Report on Patentability for corresponding International (PCT) application PCT/ EP2020/051830, dated Jul. 27, 2021, 7 pages.
Japanese search report for corresponding Japanese Application JP2021-535763, 18 pages, dated Aug. 8, 2023.
First Japanese Office Action for corresponding Japanese Application JP2021-535763, 6 pages, dated Sep. 20, 2023.
Second Japanese Office Action for corresponding Japanese Application JP2021-535763, 4 pages, dated Apr. 25, 2024.
Japanese Decision to Grant for corresponding Japanese Application JP2021-535763, 5 pages, dated Jul. 31, 2024.
Chinese Office Action for corresponding Chinese patent application 202080007063.3, 19 pages, dated Jun. 30, 2022.
Chinese Second Office Action for corresponding Chinese patent application 202080007063.3, 8 pages, dated Nov. 10, 2022.

* cited by examiner

*Primary Examiner* — Robert T Butcher
(74) *Attorney, Agent, or Firm* — Ruggiero McAllister & McMahon LLC

(57) ABSTRACT

There is a non-aqueous gel writing ink having an organic solvent, a coloring agent and a gelling agent, and the gelling agent is non-oxidized cellulose nanofibers. There also is a use of non-oxidized cellulose nanofibers as a gelling agent in a non-aqueous gel writing ink. There is finally a writing instrument having the ink according to the present disclosure.

17 Claims, 1 Drawing Sheet

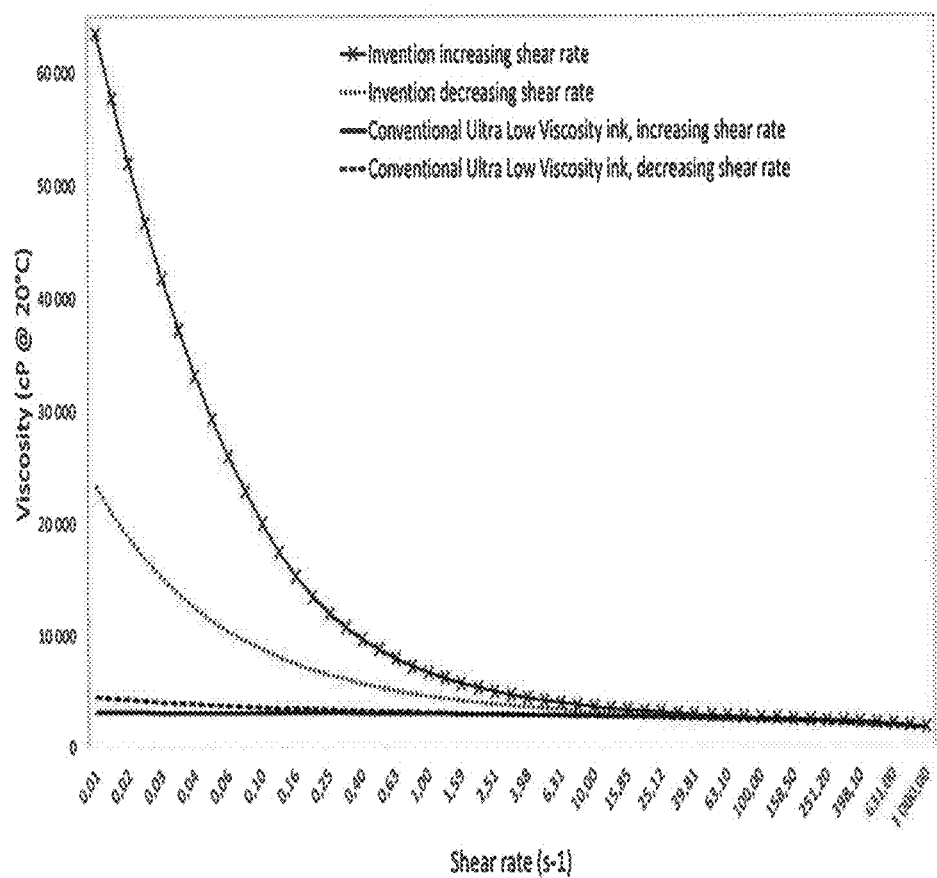

NON NEWTONIAN BALLPOINT PEN INK COMPRISING CELLULOSE NANOFIBERS

CROSS REFERENCE TO RELATED APPLICATIONS

This application is a National Stage Application of International Application N° PCT/EP2020/051830, filed on Jan. 24, 2020, now published as WO/2020/152357 and which claims priority from EP19305099.4, filed on Jan. 25, 2019, the entire contents of both of which are incorporated herein by reference.

FIELD OF THE DISCLOSURE

The present disclosure relates to the writing ink area, in particular ink for pen.

DESCRIPTION OF THE RELATED ART

Conventionally, ball pen inks are Newtonian high viscosity solvent based ink. Due to the use of heavy glycols solvents, ball pen inks are very stable during storage since the ink doesn't dry. Therefore the ink can be used in pens without point protection. Ball pen viscosity was defined at ~15 000 mPa·s at 20° C. to avoid static leakage (static leakage corresponds to the ink drop formation on the point when the pen is stored point down, especially in hot and humid condition).

With such a high shear viscosity, writing experience is not as smooth as the consumer would want:

To improve the smoothness, formulator can decrease the viscosity. However in this case, rest viscosity becomes too low and static leakage dramatically increases.

Ball pen inks being Newtonian, rest viscosity is the same as shear viscosity. The rest viscosity remaining relatively low (15 000 mPa·s at 20° C.), this prohibits the addition of pigments or other particles (due to low rest viscosity, these particles would settle in pen points and clog them).

Conventionally ball pen inks are high-viscosity inks having a viscosity of a few thousand mPa·s or higher. This results in a bad touch of writing because the ball rotates with a high resistance when ink flows out from the writing tip. Furthermore, ball-pen inks undergo great variations in their physical properties such as viscosity depending on surrounding temperatures. Thus, the ink flow in a conventional ball pen ink is not smooth. There is therefore a need to improve the ball pen inks to obtain ball-pen inks, in particular homogeneous ones, with a consistent and smooth writing, and/or no line breakage or clogging of the pen's nib, and excellent storage stability (no static leakage and/or stability of the viscosity).

Therefore, in order to solve these problems, the formulator turned to gel ink. Gel inks have a pseudoplastic rheological profile. In general gel inks are water based. They are a perfect compromise between low static leakage, smoothness and particles stabilization.

However they suffer from several drawbacks:

Water is a light and volatile solvent. When stored without point protection (cap or hotmelt), ink in the point can dry then clog the point; cap off time of gel inks is much lower as cap off time of solvent based ball pens.

Despite the use of corrosion inhibitors, water-based inks remain corrosive fluids.

It is therefore impossible to use brass points and it is mandatory to use stainless steel points which are quite expensive materials and difficult to manufacture (hard material).

Water being a bad lubricant, it is also mandatory to use points with strong flow (~300 mg/200 m for water-based inks tips versus ~35 mg/200 m for solvent based inks tips). As a result, mileage (total length of writing of the pen) of aqueous inks is much lower than mileage of solvent inks pens.

Today, some hybrid inks exist: it consists in thickened water emulsified in a solvent based ball pen ink. This solution allows bringing smoothness but present 3 mains problems:

Poor ageing: difficult to formulate a stable emulsion and risk of losing water during ageing. If it occurs, gelling agent will precipitate due to the lack of water and the precipitate will clog points.

It doesn't solve the problem of point corrosion. Due to water presence, it is still mandatory to use stainless steel points.

Color is weaker than in ball point pen inks due to the inclusion of water droplets inside the ink. The inventors have discovered that this technical problem can be solved by using non-oxidized cellulose nanofibers as a gelling agent in a solvent-based ink. JP2017105907A discloses the use of non-oxidized cellulose nanofibers having a diameter in the range 10 to 200 nm as a gelling agent but only in an aqueous gel ink composition for writing instrument such as ball-point pen and marking pen. Therefore this document neither discloses nor suggests using non-oxidized cellulose nanofibers in non-aqueous gel ink composition.

Solvent gel inks have also been described in the prior art.

In particular JP2018135405A discloses an oil-based ink composition for writing instrument, such as ballpoint pen and marking pen. The ink composition comprises an organic solvent and oxidized cellulose nanofibers combined with polyether amine, the oxidized cellulose nanofibers having a diameter of between 2 and 500 nm. However the cellulose is not used to provide a non-Newtonian nature to the ink but to inhibit sedimentation and separation of insoluble components without raising the viscosity of the ink.

SUMMARY OF THE DISCLOSURE

The present disclosure concerns a non-aqueous gel writing ink comprising an organic solvent, a coloring agent and a gelling agent, wherein the gelling agent comprises (more specifically consists essentially of, in particular consists of) non-oxidized cellulose nanofibers, more specifically non-etherified non-oxidized cellulose nanofibers, even more specifically the non-oxidized cellulose nanofibers being water-insoluble.

The writing ink according to the disclosure does not have the above-mentioned disadvantages of the prior arts, and exhibits good performances in term of presenting no static leakage and no settlement and the low viscosity under shear enables good writing smoothness, in particular without line breakage. In addition, according to a preferred embodiment, the ink has a good stability over time, in particular in terms of viscosity, for example, after 1 month storage at ambient temperature, or better after 3 months.

BRIEF DESCRIPTION OF THE DRAWING

The FIGURE depicts a plot of shear rate versus viscosity for the ink of Example 1 according to the present disclosure.

DETAILED DESCRIPTION OF THE DISCLOSURE

For the purposes of the present disclosure, the term "writing ink" is intended to mean any ink which is intended to be used in a writing instrument, in particular in a pen such as a ball-pen. A writing ink should not be confused with a printing ink which is used in printing machines and which does not have the same technical constraints and thus the same specifications. In addition, it must allow an ink flow rate suitable for the writing instrument used, in particular a flow rate of between 10 and 300 mg/200 m of writing, more specifically between 30 and 60 mg/150 m of writing, even more specifically of 50 mg/150 m. It must also dry sufficiently rapidly to avoid smudging the writing medium. It must also avoid the problems of migration (bleeding) over time. Thus, the ink according to the present disclosure will be suitable for the writing instrument for which it is intended, in particular for a pen such as a ball-pen.

In addition, a writing ink must not be too fluid, so as to avoid leaks during writing. However, it must be sufficiently fluid to facilitate the flow of the writing action.

In the particular case, the writing ink being a "gel ink" (which corresponds therefore to a thixotropic ink), the viscosity measured at rest (at a shear rate of $0.01$ $s^{-1}$) at $20°$ C. is different (significantly different and therefore not slightly different) and in particular higher than the viscosity measured with a shear rate of $100$ $s^{-1}$ at $20°$ C. using the same rheometer such as a cone-and-plate rheometer for example Malvern KINEXUS with a cone of 40 mm and an angle of $4°$. In particular, the viscosity measured at rest (at a shear rate of $0.01$ $s^{-1}$) at $20°$ C. is at least ten times higher, more specifically at least fifteen times higher, even more specifically at least twenty times higher, than the viscosity measured with a shear rate of $100$ $s^{-1}$ at $20°$ C. using the same rheometer such as a cone-and-plate rheometer for example Malvern KINEXUS with a cone of 40 mm and an angle of $4°$.

Such ink is usually called a non-Newtonian viscosity ink, i.e. an ink in which rest viscosity is not the same as shear viscosity. In a particular embodiment, the viscosity of the gel ink according to the present disclosure measured at $20°$ C. with a cone-and-plate rheometer for example Malvern KINEXUS with a cone of 40 mm and an angle of $4°$ is of between 10 000 and 200 000 mPa·s, more specifically between 20 000 and 160 000 mPa·s, even more specifically between 30 000 and 120 000 mPa·s, with a shear rate of $0.01$ $s^{-1}$ and more specifically between 500 and 20 000 mPa·s, even more specifically between 1200 and 10 000 mPa·s, still more specifically between 1500 mPa·s and 5000 mPa·s with a shear rate of $100$ $s^{-1}$.

The return to viscosity at rest after shear is very quick, more specifically at most a few minutes, in order to avoid the static leakage in the minutes after writing.

The ink according to the present disclosure is a "non-aqueous ink". The term "non-aqueous ink" is intended to mean in the context of the present disclosure a water-free ink, i.e. any ink which does not contain any aqueous solvent and more specifically which does not contain any water, even in a small proportion. This is because the gelling agent (capable of generating a gelling effect) contained therein makes the use of aqueous solvent needless in order to obtain a gel.

However, the ink according to the present disclosure contains an organic solvent (which is not an aqueous solvent), in particular chosen in the group consisting of glycols, ethers such as glycol ethers, alcohols, and mixtures thereof, more specifically in the group of glycols, in particular glycol ethers.

In an advantageous embodiment, the organic solvent is chosen in the group consisting of alcohols such as benzyl alcohol, glycerin and mixtures thereof.

In an advantageous embodiment, the alcohols are high boiling points alcohol, more specifically alcohols having a boiling point higher than $150°$ C.

In an advantageous embodiment, the glycols are glycol ethers which can be chosen in the group consisting of ethylene glycol, diethylene glycol, propylene glycol, dipropylene glycol, trimethylene glycol and mixtures thereof.

In another advantageous embodiment the glycol ether is chosen in the group consisting of diethylene glycol monoethyl ether, diethylene-glycol-mono butyl ether, dipropyleneglycol monobutyl ether, tripropylene glycol monomethyl ether, phenoxyethanol, phenoxypropanol (in particular 1-phenoxy-2-propanol) and mixtures thereof, more specifically chosen in the group consisting of ethylene glycol and/or propylene glycol and/or phenoxypropanol, still more specifically chosen in the group consisting of phenoxyethanol, phenoxypropanol (1-phenoxy-2-propanol) and mixtures thereof.

In a further advantageous embodiment the organic solvent is phenoxypropanol (in particular 1-phenoxy-2-propanol).

More specifically, the organic solvent content of the ink according to the present disclosure is between 35 and 80% by weight, relative to the total weight of the ink, even more specifically between 45 and 75% by weight, relative to the total weight of the ink, still more specifically between 50 and 70% by weight, relative to the total weight of the ink.

The ink according to the present disclosure also contains a coloring agent in order to impart color to the ink according to the present disclosure.

The coloring agent can be a pigment or a dye or a mixture thereof, in particular conventional dyes or pigments employed in non-aqueous ball point pens.

More specifically it is a dye. In this case the ink is a dye-based ink. It thus comprises at least one dye. It may also comprise several thereof. The dyes usable in the ink according to the disclosure may be any dyes known by the one skilled in the art, such as black, blue, red, green, violet, pink, turquoise, etc. dyes. In particular, the dyes usable in the ink according to the present disclosure are alcohol-soluble dyes, oil-soluble dyes, direct dyes, acid dyes, basic dyes, metallized dyes and various salt-forming type dyes, more particularly the dyes are chosen in the group consisting of azoic dyes, triarylmethane dyes, phtalocyanine derivatives dyes, xanthene dyes and mixtures thereof.

Azoic dyes contain an azoic skeleton having the formula below:

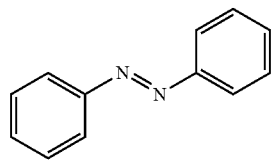 [SMILES: c1ccc(/N=N/c2ccccc2)cc1]

Triarylmethane dyes contain a tryarylmethane skeleton having the formula below:

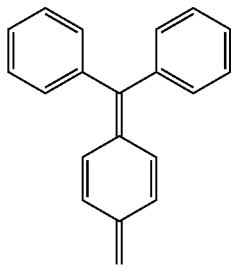 [SMILES: C=c1ccc(=C(c2ccccc2)c2ccccc2)cc1]

Phtalocyanine derivatives dyes contain a phtalocyanine skeleton having the formula below:

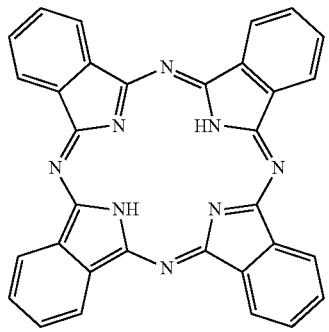 [SMILES: c1ccc2c(c1)-c1nc-2nc2[nH]c(nc3nc(nc4[nH]c(n1)c1ccccc41)-c1ccccc1-3)c1ccccc21]

Xanthene dyes contain a xanthene skeleton having the formula below:

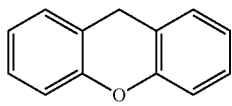 [SMILES: c1ccc2c(c1)Cc1ccccc1O2]

Examples of a solvent dye usable in the ink according to the present disclosure are as follow: VARIFAST Black 3806 (C.I. Solvent Black 29), 3807 (trimethylbenzylammonium salt of C.I. Solvent Black 29), Spirit Black SB (C.I. Solvent Black 5), SPIRON Black GMH (C.I. Solvent Black 43), Solvent Black 46, VARIFAST Red 1308 (salt forming form of C.I. Basic Red 1 dye and C.I. Acid Yellow 23 dye), Solvent Red 49, VARIFAST Yellow AUM (salt forming form of C.I. Basic Yellow 2 dye and C.I. Acid Yellow 42 dye), SPIRON Yellow C2 GH (organic acid salt of C.I. Basic Yellow 2), SPIRON Violet CRH (C.I. Solvent Violet 8-1), VARIFAST Violet 1701 (salt forming form of C.I. Basic Violet 1 and C.I. Acid Yellow 42 dye), SPIRON Red CGH (organic acid salt of C.I. Basic Red 1), SPIRON Pink BH (C.I. Solvent Red 82), Nigrosine Base EX (C.I. Solvent Black 7), Oil Blue 613 (C.I. Solvent Blue 5), Neozapon Blue 808 (C.I. Solvent Blue 70), In another embodiment, the coloring agent is a pigment known by the one skilled in the art. Examples of the pigment include organic, inorganic and processed pigments. Thus the pigment may for example be an inorganic pigment such as a carbon black, ultramarine and titanium dioxide pigment, an organic pigment such as an azo-based pigment, phthalocyanine-based pigment, indigo pigment, thioindigo pigment, thren pigment, quinacridone-based pigment, anthraquinone-based pigment, thron-based pigment, diketopyrrolopyrrole-based pigment, dioxazine-based pigment, perylene-based pigment, perinone-based pigment and isoindolinone-based pigment, a metal pigment such as an aluminum powder or aluminum powder whose surface is treated with a colored resin, a metal gloss pigment obtained by forming a metal vapor deposition film such as that of aluminum on a transparent or colored transparent film, a metal pigment having a thickness of 0.01 to 0.1 μm obtained by peeling a metal vapor deposition film such as that of aluminum formed on a substrate such as a film, a colloidal particle having a mean particle size of 5 to 30 nm selected from gold, silver, platinum and copper, a fluorescent pigment, light-storing pigment, pearl pigment obtained by coating the surface of a core which is a naturally occurring mica, synthetic mica, glass flake, alumina and transparent film with a metal oxide such as titanium oxide, and the like.

More specifically, the coloring agent content of the ink according to the present disclosure is between 5 and 30% by weight relative to the total weight of the ink, even more specifically between 7 and 28% by weight relative to the total weight of the ink. The ink according to the present disclosure also comprises a gelling agent, wherein the gelling agent comprises (more specifically consists essentially of, in particular consists in) non-oxidized cellulose nanofibers.

In the context of the present disclosure "non-oxidized cellulose nanofibers" is intended to mean any cellulose nanofibers which were not subjected to an oxidation treatment, such as a treatment modifying a part of hydroxyl groups (—OH groups) of β-glucose constituting cellulose [$(C_6H_{10}O_5)_n$: natural polymer in which numbers of β-glucose molecules are linearly polymerized via glycosidic bonds] by at least one functional group of an aldehyde group (—CHO group) and/or a carboxyl group (—COOH group).

In particular, "non-oxidized cellulose nanofibers" is intended to mean any cellulose nanofibers which were not subjected to an oxidation treatment.

Therefore oxidized cellulose includes, for example, cellulose in which hydroxyl groups (—OH groups) at least in a C6-position of the β-glucose described above are oxidized and modified to an aldehyde group (—CHO group) and/or a carboxyl group (—COOH group). According to a preferred embodiment of this disclosure, "non-oxidized cellulose nanofibers" are not etherified. In particular, the non-oxidized cellulose nanofibers are not etherified with a hydroxyalkyl group, more specifically in which the alkyl group is in $C_1$-$C_6$, and/or not etherified with an alkyl group, more specifically in which the alkyl group is in $C_1$-$C_6$, and in particular are not etherified with hydroxyethyl and/or hydroxypropyl and/or ethyl radicals. Hence, the non-etherified cellulose nanofibers are different from hydroxyethylcellulose, ethyl hydroxyethylcellulose or hydroxpropylcellulose. Hydroxyethylcellulose and/or hydroxypropylcellulose are nonionic and water-soluble polymers.

According to a preferred embodiment, the "non-oxidized cellulose nanofibers" according to the disclosure have not been subjected to a treatment modifying a part of hydroxyl groups (—OH groups) of β-glucose constituting cellulose $(C_6H_{10}O_5)_n$. More specifically, according to the present disclosure, non-oxidized cellulose nanofibers, and in particular non-etherified non-oxidized cellulose nanofibers, are water-insoluble (contrary to hydroxyethylcellulose and/or hydroxypropylcellulose which are water soluble).

In addition, more specifically, "non-oxidized cellulose nanofibers" according to the present disclosure, and in particular non-etherified non-oxidized cellulose nanofibers; are insoluble in organic solvents usually used in non-aqueous writing inks, more specifically chosen among polar aprotic solvents and/or polar protic solvents such as alcohol or glycol as mentioned above.

Cellulose nanofibers comprised in the gel writing ink according to the disclosure are cellulose uniformly micronized at the nano level. They are basically chemically and/or physically untangled plant fibers. Cellulose nanofibers can be prepared from any cellulose source material such as plant, tree and/or wood biomass and are therefore very recyclable and biodegradable. They are in particular made from wood or bamboo biomass, in particular from wood pulp. The cellulose nanofibers may be isolated from the wood-based fibers using mechanical methods which expose the pulp to high shear forces, ripping the larger wood-fibers apart into nanofibers. For this purpose, high-pressure homogenizers, ultrasonic homogenizers, grinders or microfluidizers can be used. The homogenizers are used to delaminate the cell walls of the fibers and liberate the nanosized fibrils. These processes are well known by the one skilled in the art.

Cellulose nanofibers are available on the market in particular from the company FUJI PIGMENT Co., Ltd. or Green Science Alliance Co., Ltd, more specifically under the tradename ASL CNF 901 fibers.

According to a preferred embodiment, non-oxidized cellulose nanofibers of the gel writing ink according to the present disclosure are in the form of a dispersion, more specifically in the form of a dispersion in an organic solvent (which is not an aqueous solvent), more specifically in the form of a dispersion in the organic solvent as described above. Since the non-oxidized cellulose nanofibers according to the disclosure are not water soluble and are also not soluble in alcohols and/or ethers usually used in non-aqueous writing gel inks, in particular such as ball pen inks, a dispersion of the non-oxidized cellulose nanofibers can be obtained in numerous solvents, which is a great advantage for the formulator.

According to a preferred embodiment, the "non-oxidized cellulose nanofibers" according to the disclosure are present in the form of a small dispersion, in particular in which the particle size, even more specifically the mean average particle diameter in intensity measured by dynamic light scattering, in particular using the MALVERN Zetasizer nano ZS apparatus, is lower than 3 micrometers.

In particular, the solid non-oxidized cellulose nanofibers have an average particle diameter below 3 micrometers as can be measured by a dynamic light scattering method, for example, a dense particle size analyzer Malvern Zetasizer Nano ZS.

Therefore, the ink according to the present disclosure can be used in pen, such as ball pen, even when the pen exhibits a small gap between the ball and the tip, such as gaps of about 2 micrometers.

Such embodiment allows to prevent the formation of an ink flow-blocking mass at the entrance of the nib, therefore to avoid line breakage and/or clogging of the tip, Such property can be obtained in combination with the absence of ink leakage.

According to a preferred embodiment, the gelling agent of the gel writing ink according to the disclosure comprises the non-oxidized cellulose nanofibers according to the disclosure in form of a 0.05-10% by weight dispersion in organic solvent, based on the total weight of the dispersion, more specifically a 1% by weight dispersion in organic solvent based on the total weight of the dispersion.

According to a preferred embodiment, the organic solvent is as described before. According to a preferred embodiment of the disclosure, the cellulose nanofibers according to the disclosure are available in the form of dispersion in phenoxypropanol (1-phenoxy-2-propanol), even more specifically a 1% by weight dispersion in phenoxypropanol (1-phenoxy-2-propanol) based on the total weight of the dispersion, such as the cellulose nanofibers dispersion sold under the tradename ASL CNF 901 fibers by Fuji Pigment Co. Ltd.

More specifically cellulose nanofibers are not bacterial nanocellulose (nano-structured cellulose produced by bacteria) nor microcrystalline cellulose nor carboxymethyl cellulose. More specifically, the diameter of the non-oxidized cellulose nanofibers according to the disclosure measured by transmission electron microscope is comprised between 1-50 nm, more specifically between 2-40 nm, and even more specifically between 4-20 nm. More specifically the length of the non-oxidized cellulose nanofibers according to the disclosure measured by transmission electron microscope is of several micrometers with large aspect ratio (length to diameter ratio).

In an advantageous embodiment, the non-oxidized cellulose nanofibers content of the ink according to the present disclosure is in the range 0.01-1%, more specifically in the range 0.05-0.50%, even more specifically 0.08-0.2%, by weight relative to the total weight of the ink.

In an advantageous embodiment, the gelling agent comprises also silica particles. In an advantageous embodiment, silica particles are hydrophilic silica particles, in particular hydrophilic fumed silica particles, such as the product sold by Evonik under the trade name AEROSIL® 200.

More specifically, the silica particles content of the ink according to the present disclosure is in the range 0.02-1%, even more specifically in the range 0.1-0.5%, by weight, relative to the total weight of the ink.

The ink according to the present disclosure may also comprise additives.

This additive is generally a conventional additive of writing inks and is in particular chosen in the group consisting of clear drain agents, viscosity imparting agent, lubricant, dispersing agent and mixtures thereof.

The ink according to the disclosure may contain (by weight relative to the total weight of the ink) between 0 and 30% of the additive, more specifically between 5 and 25%, even more specifically between 10 and 20%.

The viscosity imparting agent can be a resin which may be natural or synthetic. The resin can be a vinyl resin (such as a vinyl chloride copolymer, polyvinyl butyrale, polyvinylpyrrolidone, a polyvinyl acetate, a vinyl-pyrrolidone and vinyl acetate copolymer, a polyvinyl alcohol resin or a mixture thereof), an acrylic resin, a styrene-acrylic resin, a styrene-maleic acid copolymer resin, a rosin-maleic acid copolymer resin, a phenol resin, a cellulosic resin, a ketone resin, a ketone-formaldehyde resin (such as an acetophenone-formaldehyde modified resin), an amid resin, an alkyd resin, a rosin modified resin, a rosin modified phenol resin, a xylene resin, a polyacetal resin, a terpene resin, a phenoxy resin or a mixture thereof.

More specifically, the viscosity imparting agent is a ketone-formaldehyde resin.

The ink according to the disclosure may contain (by weight relative to the total weight of the ink) between 0 and 40% of the viscosity imparting agent, more specifically between 5 and 35%, even more specifically between 7 and 30%.

The clear drain agents can be for example sorbitan sesquioleate in particular sold under the trade name Lonzest® SOC.

The ink according to the disclosure may contain (by weight relative to the total weight of the ink) between 0 and 5% of the clear drain agent, more specifically between 0.5 and 2%, even more specifically between 1 and 1.5%.

According to a preferred embodiment of the disclosure, the clear drain agents may be present in the ink in a mass content ranging from 0.01% to 5%, more specifically ranging from 0.5% to 2%, even more specifically ranging from 1% to 1.5%, by weight relative to the total weight of the ink.

The dispersing agent is particularly useful when the coloring agent is a pigment and can be Tego®Dispers 670, Tego® Dispers 671, Tego®Dispers 672, Tego®Dispers 685, Tego®Dispers 688, Tego®Dispers 690, Tego®Dispers 710 by Evonik. The ink according to the disclosure may contain (by weight relative to the total weight of the ink) between 2 and 20% of the dispersing agent, more specifically between 5 and 15%.

The process of preparation of the non-aqueous gel writing ink according to the present disclosure is well known to the one skilled in the art and consists only in the mixing of all the components in the organic solvent.

The present disclosure also concerns the use of non-oxidized cellulose nanofibers according to the disclosure as gelling agent in a non-aqueous gel writing ink.

Finally the present disclosure concerns a writing instrument, in particular a pen such as a ball-pen, containing the ink according to the present disclosure.

The present disclosure will be understood more clearly in the light of the examples which follows, which are given by way of non-limiting indication.

In the Examples, the viscosity is measured at 20° C. using a cone-and-plate rheometer Malvern KINEXUS with a cone of 40 mm and an angle of 4°.

The expression "comprising a" should be understood as being synonymous with "comprising at least one".

The expression "between . . . and . . . " or "ranging from . . . to . . . " should be understood as including the values of the limits.

EXAMPLES

Example 1: Ink Composition According to the Present Invention

Table 1 below shows the composition of an ink according to the present invention.

| Trade name | Chemical name | Content in wt. % | Function |
|---|---|---|---|
| Phenoxypropanol = PPH | Phenoxypropanol | 30.6 | Solvent |
| Aerosil 200 ® | Fumed silica | 0.4 | Gel effect |
| ASL CNF 901 fibers ® (Fuji preparation = 1% cellulose in phenoxypropanol) (supplier: Fuji pigment co ltd) | Non-oxidized cellulose nanofibers in phenoxypropanol | 9.9 phenoxypropanol + 0.1 nanofibers | Gel effect |
| Solvent red 49 | Solvent red 49 | 2.5 | Coloring agent |
| Solvent black 46 (50% solution in phenoxyethanol) | Solvent black 46 | 23.65 phenoxyethanol + 23.65 dye | Coloring agent |
| Ketonic resin | Resin | 9.2 | Additive: Resin |
| Total | | 100 | |

In a first step, a matrix composed of 1% nanofibers (ASL CNF 901 Fibers®) by weight dispersed in 99% phenoxypropanol by weight based on the total weight of the dispersion has been used. The dispersion is homogeneous. The "non-oxidized cellulose nanofibers" are present in the form of a small size particles dispersion wherein the mean diameter particle size is lower than 3 micrometers as measured by a dynamic light scattering method (Malvern Zetasizer nano ZS). Then, 10% by weight of the matrix (therefore 0.1% by weight of the nanofibers and 9.9% by weight of phenoxypropanol) has been mixed with 0.4% by weight fumed silica and 30.6% by weight phenoxypropanol (solvent), based on the total weight of the ink composition. The mixture has been stirred with a homogenizing mixer at a speed of 1 m·s$^{-1}$ during 15 minutes and heated at a temperature of 60° C. Then, 2.5% by weight solvent red 49 (additive: dye), 47.3% by weight solvent black 46 (additive: dye), based on the total weight of the ink composition, have been added to the mixture. The mixture has been stirred with a homogenizing mixer at a speed of 1 m·s$^{-1}$ during 15 minutes and heated at a temperature of 60° C. Then, 9.2% by weight ketonic resin (additive: resin), based on the total weight of the ink composition, has been added to the mixture. The mixture has been stirred with a homogenizing mixer at a speed 2 m·s$^{-1}$ during 180 minutes and heated at a temperature of 60° C. The composition of this ink is a homogeneous dispersion and has an appropriately gelled consistency. ASL CNL 901 Fibers® provides a good gelling network and it can be used as a gelling agent according to the present invention.

The viscosity of the ink is as follow:
64 000 mPa·s at 20° C. with a shear rate of 0.01 s$^{-1}$
2585 mPa·s at 20° C. with a shear rate of 100 s$^{-1}$ The ink obtained presents a smooth and consistent writing, with no line breakage and excellent storage stability (no static leakage and stability of the viscosity).

Example 2

The viscosity of the ink according to example 1 has been measured at 20° C. with a cone-and-plate rheometer Malvern KINEXUS with a cone of 40 mm and an angle of 4° with an increasing shear rate (from 0.01 s$^{-1}$ to 1000 s$^{-1}$) and with a decreasing shear rate (from 1000 s$^{-1}$ to 0.01 s$^{-1}$) and has been compared to the viscosity of a Conventional Ultra Low viscosity Ink: BIC Atlantis® Exact Ball-pen measured in the same conditions.

The results are presented in the FIGURE.

The viscosity of the ink according to example 1 is shear rate dependent.

High viscosity at rest: no static leakage+no settlement in case of ink with particles Low viscosity: At high shear during writing: excellent writing smoothness.

Conventional Ultra Low viscosity Ink: The viscosity is not shear dependent.

Comparative Example 1

Table 2 below shows the comparative ink composition 2 wherein the non-oxidized cellulose nanofibers has been replaced weight by weight by hydroxypropylcellulose (MW 100 000 g/mol).

TABLE 2

| Trade name | Chemical name | Content in wt. % | Function |
|---|---|---|---|
| Phenoxypropanol = PPH | Phenoxypropanol | 30.6 | Solvent |
| Aerosil 200 ® | Fumed silica | 0.4 | Gel effect |
| Hydroxy-propylcellulose (Supplier: Dow Chemicals) | Hydroxy-propylcellulose | 9.9 phenoxy-propanol + 0.1 hydroxy-propylcellulose | — |
| Solvent red 49 | Solvent red 49 | 2.5 | Coloring agent |
| Solvent black 46 (50% solution in phenoxyethanol) | Solvent black 46 | 23.65 phenoxy-ethanol + 23.65 dye | Coloring agent |
| Ketonic resin | Resin | 9.2 | Additive: Resin |
| Total | | 100 | |

In a first step, a mixture composed of 1% by weight hydroxypropylcellulose (MW 100 000 g/mol) in 99% by weight phenoxypropanol has been used, based on the total weight of the matrix. The hydroxypropylcellulose is not present in the form of small size dispersion, but is soluble in phenoxypropanol. Then, 10% by weight of the mixture has been mixed with 0.4% by weight fumed silica and 30.6 by weight % phenoxypropanol (solvent), based on the total weight of the ink composition. The mixture has been stirred with a homogenizing mixer at a speed of 1 m·s$^{-1}$ during 15 minutes and heated at a temperature of 60° C. Then, 2.5 by weight % solvent red 49 (additive: dye), 47.3% by weight solvent black 46 (additive: dye), based on the total weight of the ink composition, have been added to the mixture. The mixture has been stirred with a homogenizing mixer at a speed of 1 m·s$^{-1}$ during 15 minutes and heated at a temperature of 60° C. Then, 9.2% by weight ketonic resin (additive: resin) based on the total weight of the ink composition has been added to the mixture. The mixture has been stirred with a homogenizing mixer at a speed 2 m·s$^{-1}$ during 180 minutes and heated at a temperature of 60° C.

The viscosity of this ink has been measured at 20° C. with a cone-and-plate rheometer Malvern KINEXUS with a cone of 40 mm and an angle of 4° with an increasing shear rate (from 0.01 s-1 to 1000 s-1) and with a decreasing shear rate (from 1000 s-1 to 0.01 s-1). The viscosity of the ink is as follow:

4050 mPa·s at 20° C. with a shear rate of 0.01 s-1
2910 mPa·s at 20° C. with a shear rate of 100 s-1

The comparative ink composition 2 comprising hydroxypropylcellulose is homogeneous but does not have an appropriately gelled consistency. This composition is a conventional Ultra-Low viscosity Ink, whose viscosity is not shear dependent as illustrated in the FIGURE. In particular, the viscosity at 20° C. is low and furthermore the measurement at rest (at a shear rate 0.01 s-1) is only slightly different from the viscosity measured with a shear rate of 100 s$^{-1}$ at 20° C.

The invention claimed is:

1. Non-aqueous gel writing ink comprising an organic solvent, a coloring agent and a gelling agent, wherein the gelling agent comprises non-oxidized cellulose nanofibers, and the non-oxidized cellulose nanofibers have an average particle diameter below 3 micrometers as measured by dynamic light scattering.

2. Non-aqueous gel writing ink according to claim 1, wherein the non-oxidized cellulose nanofibers are in the form of a dispersion.

3. Non-aqueous gel writing ink according to claim 1, wherein the fibers of the non-oxidized cellulose nanofibers have a diameter in the range 1-50 nm measured by transmission electron microscope.

4. Non-aqueous gel writing ink according to claim 1, wherein the non-oxidized cellulose nanofibers content is in the range 0.01-1% by weight relative to the total weight of the ink.

5. Non-aqueous gel writing ink according to claim 1, wherein the organic solvent is chosen in the group consisting of glycols, alcohols, and mixtures thereof.

6. Non-aqueous gel writing ink according to claim 1, wherein the organic solvent content is between 35 and 80% by weight, relative to the total weight of the ink.

7. Non-aqueous gel writing ink according to claim 1, wherein the coloring agent is a dye, a pigment or mixtures thereof.

8. Non-aqueous gel writing ink according to claim 1, wherein the coloring agent content is between 5 and 30% by weight, relative to the total weight of the ink.

9. Non-aqueous gel writing ink according to claim 1, wherein the gelling agent comprises also silica particles.

10. Non-aqueous gel writing ink according to claim 1, further comprising additives.

11. Non-aqueous gel writing ink according to claim 1, wherein the additive content is between 0 and 30% by weight, relative to the total weight of the ink.

12. Non-aqueous gel writing ink according to claim 1, wherein its viscosity measured at 20° C. with a cone-and-plate rheometer is between 10,000 and 200,000 mPa·s at a shear rate of 0.01 s$^{-1}$ and is between 500 and 20,000 mPa·s at a shear rate of 100 s$^{-1}$.

13. A writing instrument containing the ink according to claim 1.

14. Non-aqueous gel writing ink according to claim 1, wherein the non-oxidized cellulose nanofibers are water-insoluble.

15. Non-aqueous gel writing ink according to claim 1, wherein the non-oxidized cellulose nanofibers content is in the range 0.05-0.50% by weight relative to the total weight of the ink.

16. Non-aqueous gel writing ink according to claim 9, wherein the silica particles content is in the range 0.02-1%, relative to the total weight of the ink.

17. Non-aqueous gel writing ink according to claim 9, wherein the silica particles are hydrophilic silica particles.

* * * * *